United States Patent [19]

Hess et al.

[11] Patent Number: 5,645,806
[45] Date of Patent: Jul. 8, 1997

[54] DECOMPOSITION OF ORGANOHALOGEN COMPOUNDS IN DUST-LADEN-WASTE GASES

[75] Inventors: Klaus Hess, Bad Dürkheim; Roland Spahl, Lorsch; Hans Christoph Horn, Lambsheim; Ingo H. Dorn, Dannstadt-Schauernheim; Günter Dinkhauser, Limburgerhof; Hans-Ingo Joschek, Mannheim, all of Germany

[73] Assignee: BASF Aktiengesellschaft, Ludwigshafen, Germany

[21] Appl. No.: 274,694

[22] Filed: Jul. 14, 1994

[30] Foreign Application Priority Data

Jul. 17, 1993 [DE] Germany ............................ 43 24 085.2

[51] Int. Cl.[6] ........................................................ C01B 7/00
[52] U.S. Cl. ..................... 423/240 S; 588/206; 588/207; 423/245.3
[58] Field of Search ........................ 423/240 S, 245.3; 588/206, 207, 209

[56] References Cited

U.S. PATENT DOCUMENTS

| | | | |
|---|---|---|---|
| 4,974,530 | 12/1990 | Lyon | 110/346 |
| 5,260,044 | 11/1993 | Hiraoka et al. | 423/240 S |
| 5,276,250 | 1/1994 | Hagenmaier et al. | 588/213 |
| 5,294,419 | 3/1994 | Hiraoka et al. | 423/239 |

FOREIGN PATENT DOCUMENTS

| | | |
|---|---|---|
| 2046281 | 10/1990 | Canada . |
| 252521 | 1/1988 | European Pat. Off. . |
| 402122 | 12/1990 | European Pat. Off. . |
| 4013340 | 10/1991 | European Pat. Off. . |
| 470659 | 2/1992 | European Pat. Off. . |
| 3644381 | 12/1986 | Germany . |
| 3933480 | 10/1989 | Germany . |

*Primary Examiner*—Deborah Jones
*Assistant Examiner*—Amy M. Harding
*Attorney, Agent, or Firm*—Keil & Weinkauf

[57] ABSTRACT

A process for decomposing organohalogen compounds which are present in dust-laden gases which have a carbon content of less than 0.6% by weight, by oxidative breakdown with the aid of solid catalysts suitable for this purpose, wherein a) the dust is deposited from the gases at 250°–500° C., and the dust-free gas is passed together with oxygen or an oxygen-containing gas over the catalyst, or b) the deposition of the dust takes place at below 250° C., the organohalogen compounds are desorbed from the dust in an oxygen-containing gas stream at 250°–500° C., and the gas stream is passed over the catalyst, or c) the dust-laden gas is passed in the presence of oxygen over the catalyst at 250°–500° C., and the dust is subsequently removed.

4 Claims, No Drawings

DECOMPOSITION OF ORGANOHALOGEN COMPOUNDS IN DUST-LADEN-WASTE GASES

The present invention relates to an improved process for decomposing organohalogen compounds present in dust-laden gases by oxidative breakdown of these compounds with the aid of a solid catalyst suitable for this purpose.

Organohalogen compounds such as, in particular, polychlorinated dibenzodioxins or polychlorinated dibenzofurans are highly toxic and, in most cases, carcinogenic. These substances are often also called dioxins, as they are hereinafter, and must be broken down virtually completely because of their properties. However, since the chemical stability of these compounds is high, this can be achieved only at correspondingly great expense.

This problem is becoming increasingly important because there are many chemical processes producing dust-laden gases containing such compounds. An example which may be mentioned is the incineration of refuse. The processing of scrap metal by melting the scrap also frequently produces dioxins, which is attributable to the residues of other materials such as plastics and textiles present in the scrap.

It is generally known to decompose organic constituents present in combustion gases in the presence of oxygen on solid catalysts suitable for this purpose. This waste gas treatment is particularly important in the case of organohalogen compounds, in particular the highly toxic dioxins.

If the waste gas contains dust, the detoxication involves considerable technical difficulties because the dioxin is not only present in the gas phase but also adsorbed on the dust.

According to DE-A 39 33 480 (page 2, lines 24 to 25), the dust is first removed at a temperature below about 180° C., although this results in a dioxin-containing dust. The dioxin bound to the dust can, as described in EP-B 252 521 (page 4, lines 36 to 50), be removed and thermally decomposed by heating the dust at 200°–550° C. with substantial exclusion of oxygen.

Another possibility (DE-A 39 33 480, page 2, lines 22 to 23) comprises carrying out dust deposition at temperatures above about 600° C., when there is simultaneous decomposition of the dioxins.

However, both methods have the disadvantage that they are energy-consuming because of the high temperatures and require extremely heat-resistant materials for the apparatus.

The removal of dust from the gases at 250°–500°C. has scarcely been considered hitherto because, according to DE-A 39 33 480 (page 2, lines 19 to 21), in this case there is new formation of the dioxins.

Although EP-A 36 44 381 describes removal of dust from gases at 300° C., the deposited dust still contains considerable amounts of dioxin and must be returned to the incineration (column 3, lines 30 to 33).

It is an object of the present invention to find an improved process for purifying dust-laden gases which remedies the disadvantages described.

We have found that this object is achieved by a process for decomposing organohalogen compounds which are present in dust-laden gases which have a carbon content of less than 0.6% by weight, by oxidative breakdown with the aid of solid catalysts suitable for this purpose, wherein
  a) the dust is deposited from the gases at 250° –500°C., and the dust-free gas is passed together with oxygen or an oxygen-containing gas over the catalyst, or
  b) the deposition of the dust takes place at below 250° C., the organohalogen compounds are desorbed from the dust in an oxygen-containing gas stream at 250°–500° C., and the gas stream is passed over the catalyst, or
  c) the dust-laden gas is passed in the presence of oxygen over the catalyst at 250°–500° C., and the dust is subsequently removed.

The formation of the dioxins can be reduced owing to the relatively small carbon content in the waste gas, which can be achieved in a known manner by appropriate control of the incineration. In this case it proves advantageous for the carbon present in the waste gas to be predominantly in the form of graphite. The carbon content can be reduced, for example, by an afterburner downstream of a drum-type furnace. The temperatures in the afterburner are influenced by the chlorine content in the waste gas and are normally about 1000°–1200° C., in which case the oxygen content is normally about 10% by volume.

The carbon content in the waste gas upstream of the filter should preferably not exceed 0.6% by weight, particularly preferably 0.4% by weight.

It has been found, surprisingly, that under these conditions an almost dioxin-free dust can be deposited at 250°–500° C.

The embodiments of the process according to the invention are explained in detail hereinafter.

Method a)

This method is particularly advisable when dust separators for operation at 250°–500° C. are available, suitable examples being electrostatic filters or cyclones. The deposited dust then contains only small amounts of dioxin, which greatly reduces the expense of disposing of the dust.

Method b)

This embodiment has the advantage of dust deposition at relatively low temperatures so that in this case it is also possible to use, for example, simple and low-cost fabric filters. The deposited dust is passed into a second chamber where the dioxin is removed by means of the oxygen-containing gas stream at 250°–500° C.

Method c)

This variant is particularly expedient for gases with a relatively low dust content. The dust-laden gas is passed directly over the catalyst in the presence of oxygen at 250°–500° C., and the dust is subsequently deposited.

The preferred temperatures in the range specified for the process are from 300° to 400° C.

The catalysts employed in the process according to the invention for decomposing the dioxins are generally known and have been described in detail (DE-A 39 33 480, page 2, lines 49 to 60). They are often based on titanium oxide or iron oxide and can be doped with nickel, chromium or copper. They are frequently also called DENOX catalysts because they have the additional ability to reduce the nitrogen oxides present in the gas to elemental nitrogen.

The process according to the invention provides a simple and low-cost way of depositing a virtually dioxin-free dust. Additional processing steps, for example thermal treatment of the deposited dust in a closed system, are unnecessary.

Example

An industrial system for the incineration of chemical waste produced a waste gas stream of 133,000 $m_3$(STP)/h which contained about 13% by volume water and about 1000 mg of dust per $m^3$(STP). The waste gas was passed to an electrostatic filter operated at about 320° C.

Measurements of the dioxin in the waste gas at the entry to the electrostatic filter showed a concentration of 1 ngTE/$m^3$(STP) (TE=toxicity equivalent). The electrostatic filter was able to reduce the dust content in the waste gas from about 1000 mg/$m^3$(STP) to below 10 mg/$m^3$(STP).

The dioxin content in the deposited dust was below 0.3 ng TE/g, and the (organic) carbon content of the dust was about 0.4% by weight. The dioxin concentration in the waste gas downstream of the electrostatic filter was 1.5 ng TE/m$^3$ (STP), and the carbon content was below 5% by weight.

Downstream of the electrostatic filter, a part stream of about 122 m$^3$(STP)/h was divided off and purified using a BASF type 0-4-86 catalyst. This catalyst is essentially composed of titanium oxide and tungsten oxide, with only relatively small amounts of other compounds such as vanadium present. The catalyst comprised a total of 1600 cells each comprising a square of 150×150 mm. The surface area was about 880 m$^2$/m$^3$.

The dioxin contents were determined as specified in VDI Directive 3499.

This method essentially comprises removing the gas stream to be analyzed with a cooled probe, separating off the residual dust content with the aid of a particle filter, and subsequently removing dioxins still present in the gas stream by cooling or adsorption. The samples are analyzed in a known manner.

We claim:

1. A process for decomposing organohalogen compounds which are present in dust-laden gases which have a carbon content of less than 0.6% by weight of the dust, by oxidative breakdown with the aid of solid catalysts suitable for this purpose, wherein a) the dust is deposited from the gases at 250°–500° C., and the dust-free gas is passed together with oxygen or an oxygen-containing gas over the catalyst, or b) the deposition of the dust takes place at below 250° C., the organohalogen compounds are desorbed from the dust in an oxygen-containing gas stream at 250°–500° C., and the gas stream is passed over the catalyst, or c) the dust-laden gas is passed in the presence of oxygen over the catalyst at 250°–500° C., and the dust is subsequently removed.

2. A process as claimed in claim 1, which is applied to decomposing aromatic halogen compounds.

3. A process as claimed in claim 2, which is applied to decomposing aromatic chlorine compounds.

4. A process as claimed in claim 3, which is applied to decomposing polychlorodibenzodioxins and/or polychlorodibenzofurans.

* * * * *